(12) United States Patent
Ford et al.

(10) Patent No.: US 6,763,163 B1
(45) Date of Patent: Jul. 13, 2004

(54) METHOD AND APPARATUS FOR SPATIAL-SHIFT WAVELENGTH MULTIPLEXING IN COMMUNICATION SYSTEMS

(75) Inventors: Joseph Earl Ford, Oakhurst, NJ (US); David Thomas Neilson, Plainboro, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 624 days.

(21) Appl. No.: 09/625,526

(22) Filed: Jul. 26, 2000

(51) Int. Cl.[7] .............................. G02B 6/34; G02B 6/26; G02B 6/293
(52) U.S. Cl. .............................. 385/37; 385/15; 385/24
(58) Field of Search .............................. 385/15, 16, 18, 385/24, 37

(56) References Cited

U.S. PATENT DOCUMENTS

| | | | |
|---|---|---|---|
| 4,747,655 A | | 5/1988 | Shirasaki |
| 5,960,133 A | * | 9/1999 | Tomlinson .................... 385/18 |
| 6,204,946 B1 | * | 3/2001 | Aksyuk et al. ................ 398/9 |
| 6,263,123 B1 | * | 7/2001 | Bishop et al. ................. 385/15 |
| 6,263,127 B1 | * | 7/2001 | Dragone et al. .............. 385/24 |
| 6,389,190 B2 | * | 5/2002 | Solgaard et al. .............. 385/18 |
| 6,415,080 B1 | * | 7/2002 | Sappey et al. ................ 385/37 |
| 6,483,962 B1 | * | 11/2002 | Novotny ...................... 385/18 |
| 6,498,872 B2 | * | 12/2002 | Bouevitch et al. ............ 385/24 |
| 6,501,877 B1 | * | 12/2002 | Weverka et al. .............. 385/31 |

* cited by examiner

Primary Examiner—John D. Lee

(57) ABSTRACT

Methods and apparatus for spatially-shifting and multiplexing optical signals for transmission in a wavelength division multiplexed or dense wavelength division multiplexed optical communication system linearly disperse the optical signals and then spatially, laterally shift the signals. The spatially shifted, dispersed signals are thereafter re-imaged to remove the linear dispersion so that the spatially shifted signals can then be transmitted through the optical communication system. The spatially-shifted, multiplexed signals have a flat passband with sharp transition points so that the transmitted signals are routed through the optical communication system with low loss and high integrity.

30 Claims, 5 Drawing Sheets

METHOD AND APPARATUS FOR SPATIAL-SHIFT WAVELENGTH MULTIPLEXING IN COMMUNICATION SYSTEMS

BACKGROUND OF THE INVENTION

1. Field of the Invention

The present invention relates generally to methods and systems for spatial-shift, wavelength multiplexing of optical signals in an optical communication system. More specifically, the invention relates to methods and systems for routing optical signals through an optical communication system by spatially shifting the signals and dispersing the signals into discrete regions onto an optical plane.

2. Description of the Related Art

With the advent of high-speed wavelength division multiplexed (WDM) and dense wavelength division multiplexed (DWDM) systems over the last few years, optical routers in such systems have played an increasingly significant role for routing multi-wavelength, highly dispersible signals through the system. Wavelength multiplexers include various designs which produce different kinds of output signals for particular applications. Generally speaking, the desired passband response of a WDM router is a flat, uniform response over a pre-determined wavelength range surrounded by sharp drop-offs for out-of-band signals. FIG. 1 illustrates the preferred or optimal passband response of a WDM or DWDM wavelength filter as a function of the transmissivity of the filter. As can be seen in FIG. 1, the response is flat at about 0 dB centered about a center wavelength $\lambda_0$. Moreover, the response has a sharp transition region to which tends to ensure that good signal transmission is achieved with little loss in the signal.

The fundamental problem associated with most diffraction grating routers is that imaging through a diffraction grating creates a linear shift of the focal spot as a function of wavelength, a result which is conflict with the goal of achieving a segmented, flat-topped passband that is inherently a non-linear function. For example, a collimated beam can illuminate a sequence of dielectric notch filters so that each reflects one wavelength range. This arrangement can produce a flat passband, but since the insertion loss scales linearly with the number of wavelength channels, it is not generally regarded as suitable for large channel count WDM or DWDM systems. Array waveguide routers (AWR), sometimes referred to as "Dragone" routers, can provide large channel counts of eighty or more but tend to produce Gaussian shaped passbands that do not have sharp transition points and are therefore quite lossy.

Free-space optical wavelength routers have been manufactured using a combination of lenses, gratings and fiber or waveguide input output elements. However, these types of routers include waveguides that have a small width core relative to the waveguide cladding layer and a minimum pitch between guiding channels on a fiber array or multi-waveguide substrate. The lateral alignment tolerance necessary to couple with less than about ten percent loss is typically one to three microns, whereas the pitch between adjacent output waveguides is from twenty in two hundred and fifty microns. This tends to create a narrow passband shape with a broad "dead" region between center wavelengths, which is highly disadvantageous for WDM and DWDM systems. To alleviate this problem, a combination of optical defocus elements, mode-expanding waveguide shapes, and closely spaced output channels can flatten the passband and reduce the dead space; however, these techniques also tend to create excess loss and reduce optical throughput efficiency.

There accordingly exists a long-felt but unresolved need in the art for methods and systems for imaging with optical routers in a communication system which produces a segmented, flat-topped passband. It would be desirable if such methods and systems look advantage of the linear dependent wavelength shift associated with spatial-shift wavelength elements in which wavelength and imaging dispersion determines a region to illuminate with an optical spectrum. It would further be desirable if the spatial shift in the spectrum were defined simply by the surface geometry of the element since this will produce a clean spatial shift with little to no loss of signal. Such needs have not heretofore been met or fulfilled in the art.

SUMMARY OF THE INVENTION

The aforementioned long-felt needs are met, and problems solved, by optical routers and methods for routing optical signals through optical communication systems provided in accordance with the present invention. The inventive methods and systems provide a spatially-shifted and multiplexed signal by first linearly dispersing a spectrum comprising a plurality of wavelengths to create a plurality of discrete regions of signal on an intermediate image plane. The linearly dispersed regions are then spatially disbursed and the discrete regions are re-imaged to remove the dispersion associated with linearly dispersing the spectrum.

The optical routers and methods provided in accordance with the invention thus achieve efficient spatial shifting of wavelengths to multiplex signals traversing the communication system. By first linearly dispersing the region into discrete regions and then spatially shifting the regions, a flat passband with sharp transition regions as a function of wavelength can be realized. Moreover, through the use of simple optical conditions, optical routers claimed and described herein are economical and easy to fabricate. Such results have not heretofore been achieved in the art.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

In the drawings wherein like reference numerals denote similar elements throughout the views.

DETAILED DESCRIPTION OF THE PRESENTLY PREFERRED EMBODIMENTS

Figure 1:
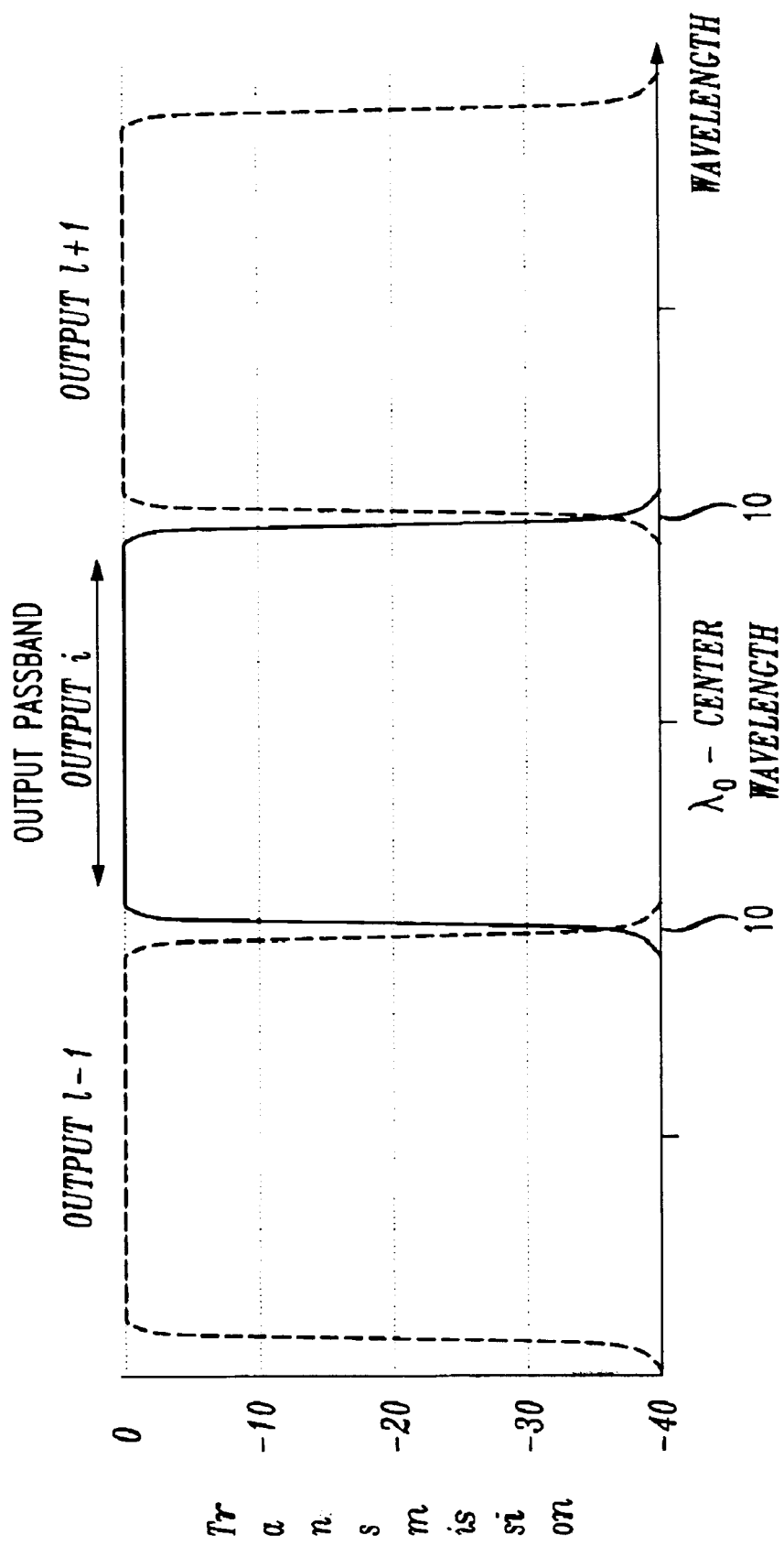
FIG. 1 is a graph of the optimal passband region which is achieved by the methods and apparatus of the present invention.
Figure 2:
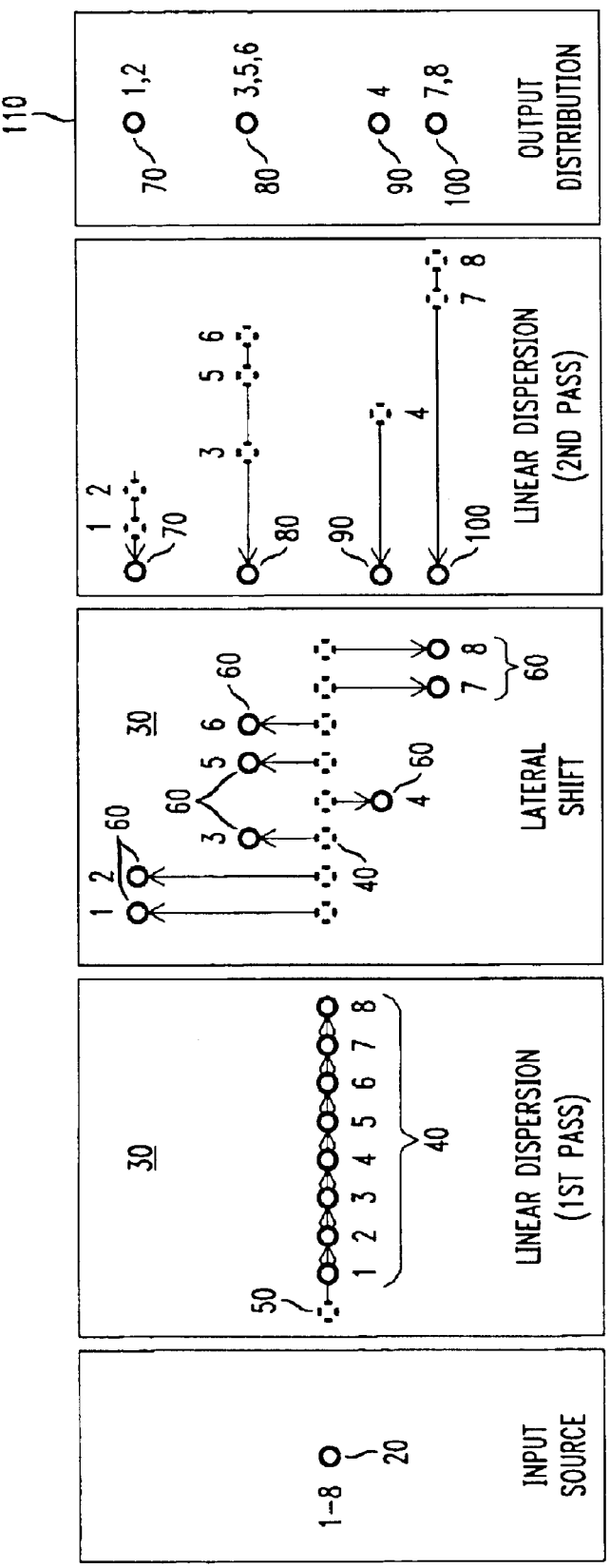
FIG. 2 is a conceptual diagram of an optical router of the present invention which linearly disperses and then spatially shifts and optical spectrum to achieve the desired optimal passband depicted in FIG. 1.

Referring now to the drawings, FIG. 2 shows conceptually the various shapes that a spectrum of light undergoes in accordance with the present invention to produce a spatially-shifted, multiplexed spectrum with an optimum passband depicted generally in FIG. 1, which is a non-linear response. An input source 20 transmits a spectrum containing a plurality of signals. In FIG. 2, the spectrum is shown by way of example as including eight discrete wavelengths, although it will be recognized by those skilled in the art that any number of discrete signals may be transmitted by input source 20. The spectrum is preferably transmitted by an optical fiber, but may also be transmitted by other equivalent input sources such as a lens, mirror, or other optical device adapted to carry multiplexed signals having a spectrum. The signal is imaged onto an intermediate image plant 30 wherein the individual wavelength signals are linearly dispersed into discrete regions in a substantially linear pattern 40 from the original position 50 of the multiplexed signal. As used herein, the term "linearly dispersed" means that the discrete regions are broken or separated into separate and distinct regions generally along a transverse, substantially linear line across the intermediate image plane.

In accordance with the invention, the linearly dispersed region on image plane 30 is then spatially, laterally shifted by a discontinuous optical element. The discontinuous optical element used to accomplish this result will preferably comprise a set of independent, micro-optic pathways having substantially adjacent entrance apertures and set of output apertures that may be set by design for the particular application in which the incentive optical routers will be implemented. Any type of device that comprises such an arrangement, or equivalents thereof, are intended to be within the scope of the present invention. For example, but without intending to limit the invention in any way, the discontinuous optical element may be a grating, interference device, spatial light modulator, lens, reflecting element, refracting element, diffracting element planar v-groove mirror, combinations thereof, and any other type of element which can spatially shift a spectrum.

Preferably, the discontinuous element is placed proximate the intermediate image plane and, as can be seen in FIG. 2, shifts the discrete regions above or below the linear dispersed pattern 40 into a plurality of spatially shifted positions 60 depending on the construction of the discontinuous optical element and as desired for the particular application in which the inventive optical router will be used. A re-imaging optical element is then employed to remove the linear dispersion introduced by the linear dispersion element so that those regions which share a common spatial position are superimposed on one another, as at 70, 80, 90 and 100 in FIG. 2, to produce the spatially shifted, multiplexed spectrum shown at 110 which has a flat passband with sharp transition points substantially as shown in FIG. 1.

Figure 3:
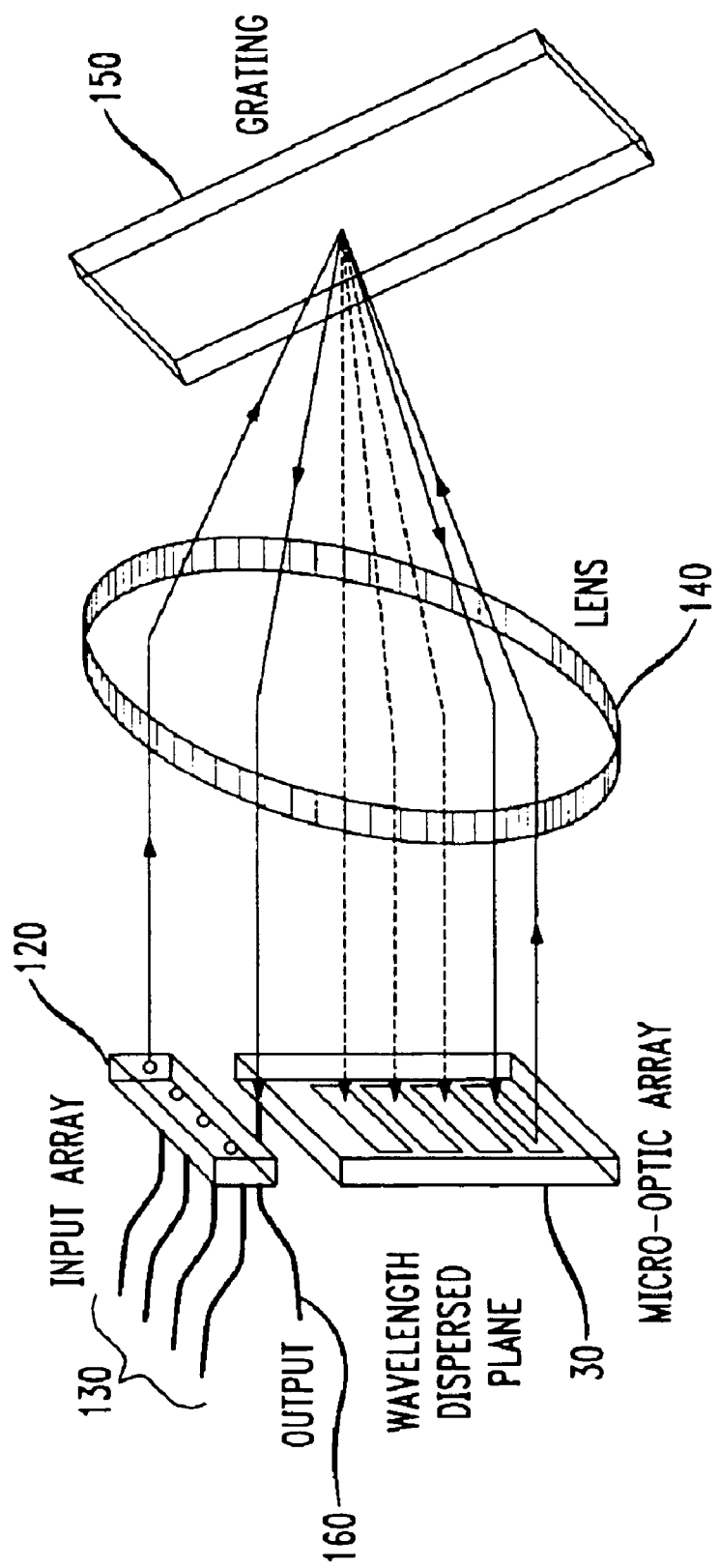
FIG. 3 is a diagrammatic view of a preferred embodiment of the inventive optical router utilizing a lens and grating to produce the desired passband of FIG. 1.

FIG. 3 depicts a preferred embodiment of an optical router of the present invention in which the linear dispersion element is a micro-optic input array 120 comprising a plurality of input fibers 130, each carrying a discrete waveguide. The intermediate image plane 30 is projected by a focussing lens 140 onto a grating 150 which acts as the discontinuous optical element of the optical router of FIG. 3.

Grating 150 is preferably a planar silicon wafer having a series of v-grooves fabricated therein which, when illuminated by the spectrally dispersed lines focussed on it by lens 140, can laterally shift the regions formed by micro-optic array 120. When the dispersed spectrum falls onto grating 150, it is reflected back through lens 140 which focuses the laterally shifted spectrum onto an output waveguide 160, thereby removing the initial linear dispersion created by the input array 120 in the first instance. This produces the flat passband response depicted in FIG. 1.

Figure 4:
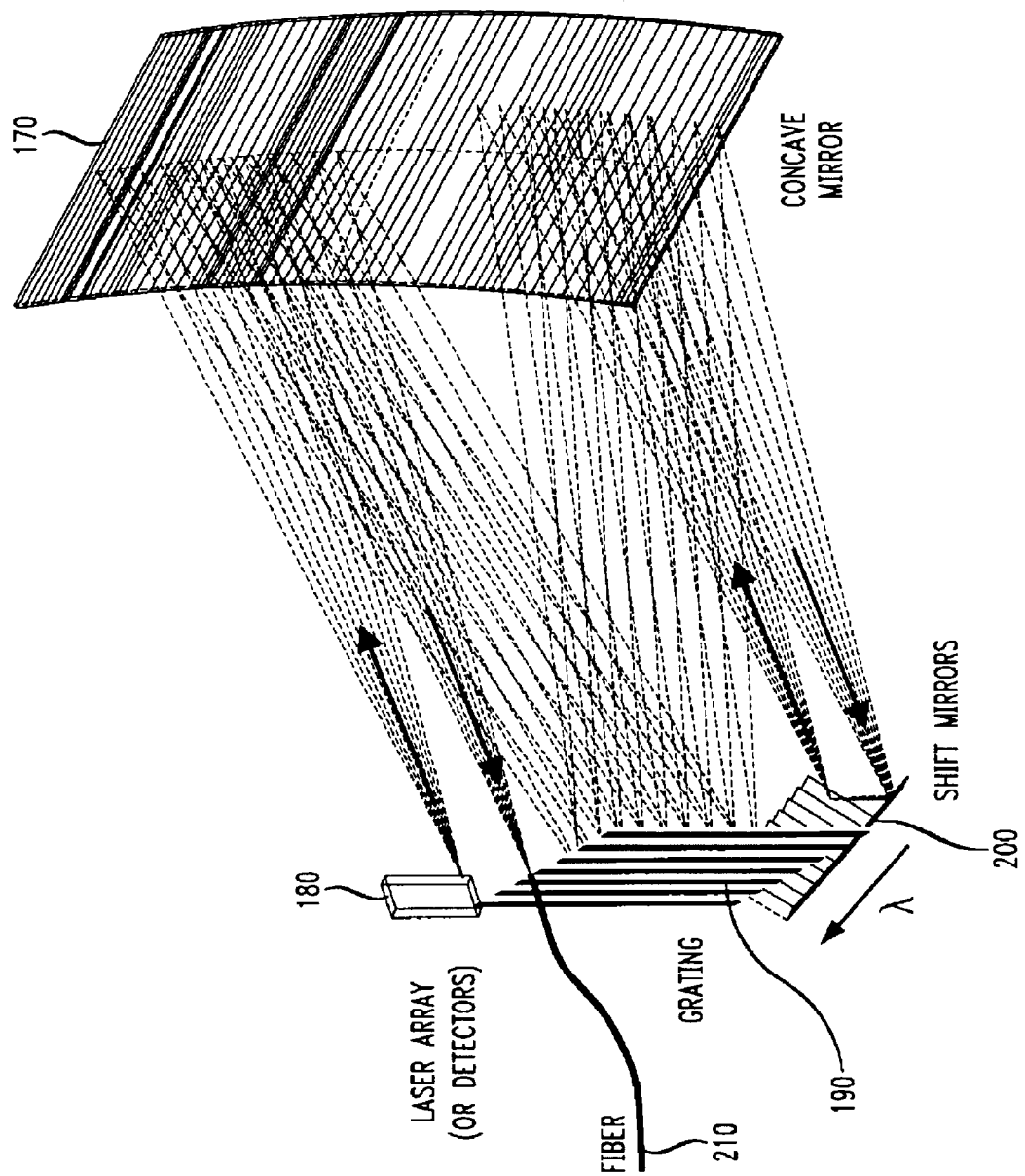
FIG. 4 is a diagrammatic view of another preferred embodiment of the inventive optical router utilizing a concave mirror.

While the embodiment of the inventive optical router shown in FIG. 3 effectively produces a spatially-shifted, multiplexed signal with a flat passband, it tends to be rather bulky in that it occupies a relatively large amount of real estate in the optical communication system. Referring now to FIG. 4, the depicted alternative embodiment of the inventive optical router advantageously reduces the physical size of the router of FIG. 3 by about half by employing a concave mirror 170 as the re-imaging element and a multiple wavelength laser array 180 as the linear input dispersion element. In accordance with the optical router embodiment of FIG. 4, laser array 180 projects a linearly dispersed spectrum onto an intermediate image plane on which is placed a grating 190 that acts as the discontinuous optical element to spatially shift the regions.

Preferably, a series of shift mirrors 200 pickup the individual regions which have been linearly dispersed by grating 190 and reflect them to concave mirror 170. Mirror 170 reflects the linearly and spatially shifted spectrum back onto the grating 190 and the grating, re-images the spectrum to remove the linear dispersion and focus the spectrum on output fiber 210.

This similarly produces a spatially shifted, flat passband output signal. Moreover, by using a concave mirror 170 to focus the spatially shifted signal back through grating 190, the grating is used to both linearly disperse and redisperse the signal, thereby greatly reducing the size of the resulting optical router. Moreover, the embodiment of FIG. 4 may be fabricated as a single molded part, for example as molded glass, plastic or glass fill epoxy, so that the device can accept waveguide arrays and fibers for use therein within a 3 to 15 micron tolerance, which is today the current the standard. The optical features such as the curved, concave mirror 170, ridged diffraction grating 190 and stepped shift mirrors 200 may all be formed by the surface topography of the molded part and optionally coated with the appropriate metal or dielectric reflectors. The optical signals are therefore transmitted back and forth within the volume of the optical router of FIG. 4 which is fully contained in a relatively small space.

Figure 5:
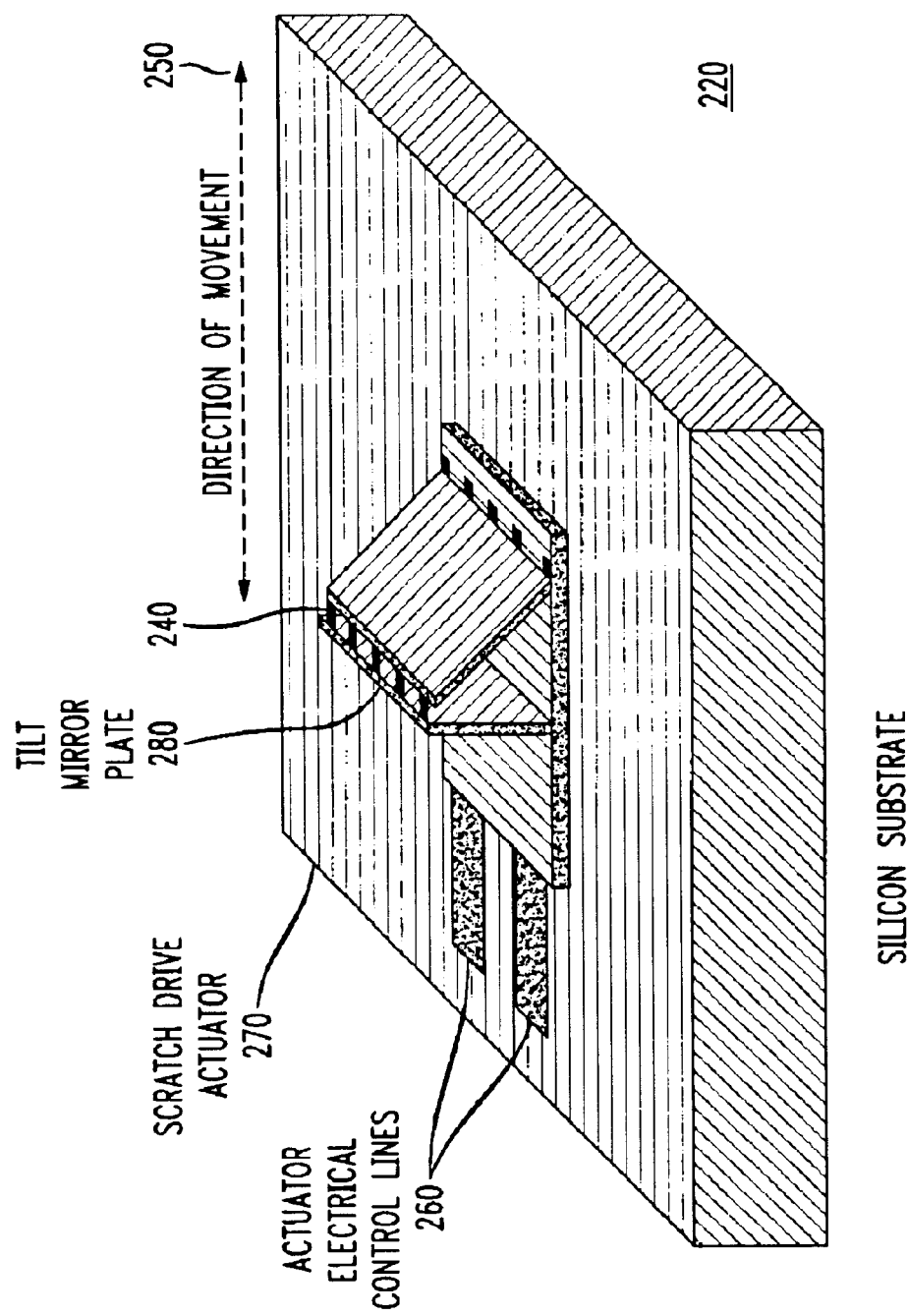
FIG. 5 is an elevated perspective view of the microelectromechanical structure (MEMS) optical router of the present invention.

The optical routers of the present invention may also be constructed as a MEMS (micro-electromechanical structure) device by fabricating the device on a silicon wafer with electromechanically actuated parts. A MEMS device of this nature will create a controllable amount of lateral shift of the spectrum, and will therefore be adjustable for use in many different types of applications. FIG. 5, depicts such a MEMS optical router 220 for producing spatially-shifted, multiplexed signals in accordance with the invention is shown at 220. As is known, the illustrated MEMS device 220 is fabricated on a silicon wafer 230 and comprises a MEMS tilt mirror 240 which moves laterally 250 across the silicon substrate when actuated by electrical control lines 260. A conventional scratch drive actuator 270 controls the movement of tilt mirror 240.

Tilt mirror 240 has an initial and a final position between which it is selectively moveable (as indicated by the arrow 250) and can therefore be used as both the linear dispersion element and the re-imaging element in accordance with the invention. A tilted mirror plate 280 acts as the discontinuous optical element to provide the lateral shift described above. Although only one tilt mirror 240 and tilted mirror plate 280 are shown in FIG. 5, it will be recognized by those skilled in the art that these two elements may instead comprise an array of optical elements as heretofore described to produce the desired spatially-shifted, multiplexed spectrum of the present invention. Moreover, the optical router of FIG. 5 may be used to control the wavelength passband position in WDM or DWDM router or to switch between multiple output waveguides by virtue of the movable nature of the combination tilt mirror 240 and tilt mirror plate 280.

Thus, the disclosed optical routers for producing spatially-shifted, multiplexed signal and methods of routing optical signals in communication systems, in accordance with the present invention, provide efficient and economical routing and transmission of optical signals. The inventive routers and methods achieved an extremely flat passband with high transmission having very sharp transition points. This advantageously allows for very low loss transmission of multiple optical channels in a communication system with notably high accuracy. Such results are highly advantageous for WDM and DWDM optical communication systems and have not therefore been effectively achieved in the art with prior optical routers and methods.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. An optical router in an optical communication system for routing multiplexed signals having a plurality of wavelengths that create a spectrum through the communication system by spatially shifting the wavelengths, said optical router including an output element comprising:
    a micro-optic array for receiving the signals having the plurality of wavelengths and for dispersing the spectrum into discrete regions onto an intermediate image plane;
    a discontinuous optical element in optical communication with the intermediate image plane for laterally shifting the discrete regions by predetermined lengths to produce a laterally shifted spectrum, each of said predetermined lengths being associated with one of the discrete regions; and
    a re-imaging optical element for receiving the laterally shifted spectrum and for removing the dispersion created by said linear element and for re-imaging the spectrum onto the output element.

2. The optical router of claim 1, wherein said micro-optic array comprises a plurality of input fibers each adapted to transmit one of the plurality of wavelengths.

3. The optical router of claim 1, wherein said discontinuous optical element comprises a grating.

4. The optical router of claim 3, wherein said grating comprises a silicon wafer and a plurality of v-shaped grooves defined in the silicon wafer.

5. The optical router of claim 1, wherein said discontinuous optical element comprises a micro-electromechanical structure (MEMS) tilt mirror plate.

6. The optical router of claim 1, wherein said re-imaging optical element comprises a lens for receiving the spatially shifted spectrum and a grating for removing the dispersion and focusing the received spatially diffused spectrum onto the output element of the router.

7. The optical router of claim 1, wherein said re-imaging element comprises a concave mirror.

8. A method for routing optical signals having a plurality of wavelengths that create a spectrum through an optical communication system by spatially shifting the wavelengths, comprising the steps of:
    linearly imaging the spectrum into discrete regions and onto an intermediate image plane, wherein the imaging step introduces linear dispersion into the spectrum;
    laterally shifting the discrete regions by predetermined lengths to produce a laterally shifted spectrum, each of said predetermined lengths being associated with one of the discrete regions; and
    re-imaging the laterally shifted spectrum to remove the linear dispersion introduced by said imaging step and for outputting the laterally shifted spectrum onto an output element in the optical communication system.

9. The method of claim 8, wherein said shifting step comprises diffracting the spectrum to introduce lateral space shifts to the discrete regions.

10. The method of claim 9, wherein said shifting step further comprises reflecting the laterally shifted spectrum with an array of reflecting mirrors before re-imaging the spectrum.

11. The method of claim 8, wherein said re-imaging step further comprises reflecting the shifted, dispersed spectrum through an element for removing the linear dispersion.

12. An optical router in an optical communication system for routing multiplexed signals having a plurality of wavelengths that create a spectrum through the communication system by spatially shifting the wavelengths, said optical router including an output element comprising:
    an electromechanically actuatable micro-electromechanical structure tilt mirror for receiving the signals having the plurality of wavelengths and for dispersing the spectrum into discrete regions onto an intermediate image plane;
    a discontinuous optical element in optical communication with the intermediate image plane for laterally shifting the discrete regions by predetermined lengths to produce a laterally shifted spectrum, each of said predetermined lengths being associated with one of the discrete regions; and
    a re-imaging optical element for receiving the laterally shifted spectrum and for removing the dispersion created by said linear element and for re-imaging the spectrum onto the output element.

13. The optical router of claim 12, wherein said discontinuous optical element comprises a grating.

14. The optical router of claim 13, wherein said grating comprises a silicon wafer and a plurality of v-shaped grooves defined in the silicon wafer.

15. The optical router of claim 12, wherein said discontinuous optical element comprises a micro-electromechanical structure (MEMS) tilt mirror plate.

16. The optical router of claim 12, wherein said re-imaging optical element comprises a lens for receiving the spatially shifted spectrum and a grating for removing the dispersion and focusing the received spatially diffused spectrum onto the output element of the router.

17. The optical router of claim 12, wherein said re-imaging element comprises a concave mirror.

18. An optical router in an optical communication system for routing multiplexed signals having a plurality of wavelengths that create a spectrum through the communication system by spatially shifting the wavelengths, said optical router including an output element comprising:

a linear element for receiving the signals having the plurality of wavelengths and for dispersing the spectrum into discrete regions onto an intermediate image plane;

a discontinuous optical grating in optical communication with the intermediate image plane for laterally shifting the discrete regions by predetermined lengths to produce a laterally shifted spectrum, each of said predetermined lengths being associated with one of the discrete regions; and a re-imaging optical element for receiving the laterally shifted spectrum and for removing the dispersion created by said linear element and for re-imaging the spectrum onto the output element.

19. The optical router of claim 18, wherein said grating comprises a silicon wafer and a plurality of v-shaped grooves defined in the silicon wafer.

20. The optical router of claim 18, wherein said re-imaging optical element comprises a lens for receiving the spatially shifted spectrum and a grating for removing the dispersion and focusing the received spatially diffused spectrum onto the output element of the router.

21. The optical router of claim 18, wherein said re-imaging element comprises a concave mirror.

22. The optical router of claim 18, wherein said linear element comprises a micro-optic array.

23. The optical router of claim 18, wherein said micro-optic array comprises a plurality of input fibers each adapted to transmit one of the plurality of wavelengths.

24. The optical router of claim 18, wherein said linear element comprises a micro-electromechanical structure tilt mirror that is electromechanically actuable.

25. An optical router in an optical communication system for routing multiplexed signals having a plurality of wavelengths that create a spectrum through the communication system by spatially shifting the wavelengths, said optical router including an output element comprising:

a linear element for receiving the signals having the plurality of wavelengths and for dispersing the spectrum into discrete regions onto an intermediate image plane;

a discontinuous optical element in optical communication with the intermediate image plane for laterally shifting the discrete regions by predetermined lengths to produce a laterally shifted spectrum, each of said predetermined lengths being associated with one of the discrete regions; and a re-imaging optical element for receiving the laterally shifted spectrum and for removing the dispersion created by said linear element and for re-imaging the spectrum onto the output element;

wherein said re-imaging optical element comprising a lens for receiving the spatially shifted spectrum and a grating for removing the dispersion and focusing the received spatially diffused spectrum onto the output element of the router.

26. The optical router of claim 25, wherein said linear element comprises a micro-optic array.

27. The optical router for claim 25, wherein said micro-optic array comprises a plurality of input fibers each adapted to transmit one of the plurality of wavelengths.

28. The optical router of claim 25, wherein said linear element comprises a micro-electromechanical structure tilt mirror that is electromechanically actuatable.

29. The optical router of claim 25, wherein said grating comprises a silicon wafer and plurality of v-shaped grooves defined in the silicon wafer.

30. The optical router of claim 25, wherein said discontinuous optical element comprises a micro-electromechanical structure (MEMS) tilt mirror plate.

* * * * *